(12) United States Patent
Singh et al.

(10) Patent No.: US 6,816,842 B1
(45) Date of Patent: Nov. 9, 2004

(54) METHOD AND APPARATUS FOR AUTOMATICALLY PROCESSING BUSINESS CONTRACT INFORMATION INTO LICENSED END-USER APPLICATION

(75) Inventors: Karamjeet Singh, Germantown, WI (US); Henry John Hummel, Jr., Waukesha, WI (US); Daniel R. Brown, Waukesha, WI (US); Thomas L. Lamoureux, Waukesha, WI (US)

(73) Assignee: GE Medical Technology Services, Inc., Waukesha, WI (US)

( * ) Notice: Subject to any disclaimer, the term of this patent is extended or adjusted under 35 U.S.C. 154(b) by 0 days.

(21) Appl. No.: 09/476,021

(22) Filed: Dec. 31, 1999

(51) Int. Cl.[7] .............................................. G06F 17/60
(52) U.S. Cl. ........................................................ 705/59
(58) Field of Search ......................... 379/93.02, 93.09, 379/93.11, 93.25; 705/59, 72, 75, 76; 709/203, 229; 713/156, 173, 175

(56) References Cited

U.S. PATENT DOCUMENTS 5,790,664 A * 8/1998 Coley et al. .................. 380/4
5,850,430 A * 12/1998 Hamalainen ............. 379/93.02

* cited by examiner

*Primary Examiner*—Pierre E. Elisca
(74) *Attorney, Agent, or Firm*—Ostrager Chong Flaherty & Broitman P.C.

(57) ABSTRACT

A system for managing the generation of licensed end-user software applications based on contracting information which is automatically fed from one or more business contract systems. A license manager communicates with a license database, a license generator and one or more business contract systems. The license manager receives an automated feed of contract and subscription information from each business contract system, interprets which of the bundled features require a license, filters or strips out the licensing information needed to generate the required license, and then logs that licensing information in the license database. If the license manager determines that a license file needs to be generated, the license manager outputs the licensing information to the license generator with a request that the latter generate a tamper-proof encrypted license file.

20 Claims, 6 Drawing Sheets

METHOD AND APPARATUS FOR AUTOMATICALLY PROCESSING BUSINESS CONTRACT INFORMATION INTO LICENSED END-USER APPLICATION

FIELD OF THE INVENTION

This invention relates generally to software protection and license monitoring of application software and information files for remote applications.

BACKGROUND OF THE INVENTION

One example of a remote application is remote monitoring and diagnosing of equipment or systems. Currently, many companies are developing capabilities for remote monitoring and diagnosing of equipment or systems. The remote equipment or systems (hereinafter referred to as remote systems) span the gamut from industrial steam turbines to networked printers, from medical imaging equipment to home appliances. In almost all cases, there is some computational capability resident on the remote systems, such as a processor. Generally, the processor performs functions such as data gathering, operation monitoring, executing diagnostic applications, and providing the end-user or customer access to information and applications on the remote systems.

In a typical remote monitoring application, software and other information files resident on a remote system are out of the direct control of the vendor because they reside in the customer's environment. But some of the software applications and information files within that processing environment are highly sensitive and need to be protected from tampering (e.g., inadvertent modification and malicious vandalism). Tampering with software applications or information files, such as configuration files that are resident on the remote system, may prevent a user from having access to a needed functionality. Alternatively, tampering could allow a user to access to a restricted functionality. It is even possible that tampering could lead to equipment failure.

Therefore, a system has been created for protecting software applications and configuration information files that are resident on a remote system from tampering. This known system uses mechanisms for ensuring that files are not accessible to a customer that has not paid for them and whose access has been terminated. These mechanisms also ensure that diagnostic utilities are not accessible to non-vendor service providers that may service the remote system.

In accordance with one known method for protecting files for licensing to a remote system, a list of files to be licensed to a remote system is input to a license generator. A file checksum generator generates respective checksum values for specified files. A license file generator generates a license file for storing references to each of the files and their corresponding checksum values. A digital signature generator generates a digital signature for the license file. A license file assignor then assigns the digitally signed license file to the remote system.

All of the foregoing steps of generating a license file are performed automatically, e.g., by a computer or data processor programmed with appropriate software. However, the list of files to be licensed is input to the license generator via a manual feed. There is a need for a system whereby essential licensing data can be automatically extracted from the contract and subscription information acquired by business contract systems and automatically fed to the license generator.

SUMMARY OF THE INVENTION

The present invention is directed to a system for managing the generation of licensed end-user software applications based on contracting information which is automatically fed from one or more business contract systems. The system comprises a license manager which communicates with a license database, a license generator and one or more business contract systems. The license manager receives an automated feed of contract and subscription information from each business contract system, interprets which of the bundled features require a license, filters or strips out the information needed to generate the required license, and then logs that licensing information in the license database.

The license manager then determines whether a license file should be presently generated based on the extracted licensing information. If the determination is in the affirmative, the license manager outputs the licensing information to the license generator with a request that the latter generate a tamper-proof encrypted license file. The license generator then generates a license file which contains remote system identification information (to prevent the license file being moved to a different system), license expiration date, a checksum value, a digital signature, and other information.

After the license generator has generated the license file and stored it in temporary storage, the license manager retrieves the license file from the temporary storage and assigns the license file to the remote system identified by the subscriber or site identification information, e.g., via a network. After downloading of the license file to the remote system, the license manager deletes the license file from temporary storage, but retains the data in the license database so that the license could be recreated at any time.

In accordance with a further feature, the system allows for the purchase of a license or subscription by a customer at a remote site. In this case, a web page is downloaded to the remote site by the license manager which comprises fields to be filled in with license information by the customer. The license information is then transmitted to the license manager, which takes the appropriate action, e.g., storing the license information in the license database and then instructing the license generator to generate a license based on that license information. In addition, the license manager sends the license information or relevant portions thereof to the business contract system to update the records of the latter.

DETAILED DESCRIPTION OF THE PREFERRED EMBODIMENTS

The following detailed description of the preferred embodiment of the invention is presented in the context of a central facility for servicing a multiplicity of remotely located medical diagnostic systems and workstations via a network. However, it should be appreciated that the invention has application in any system where remote systems utilize licensed software and/or database files and are connected to a central facility via a network.

Figure 1:
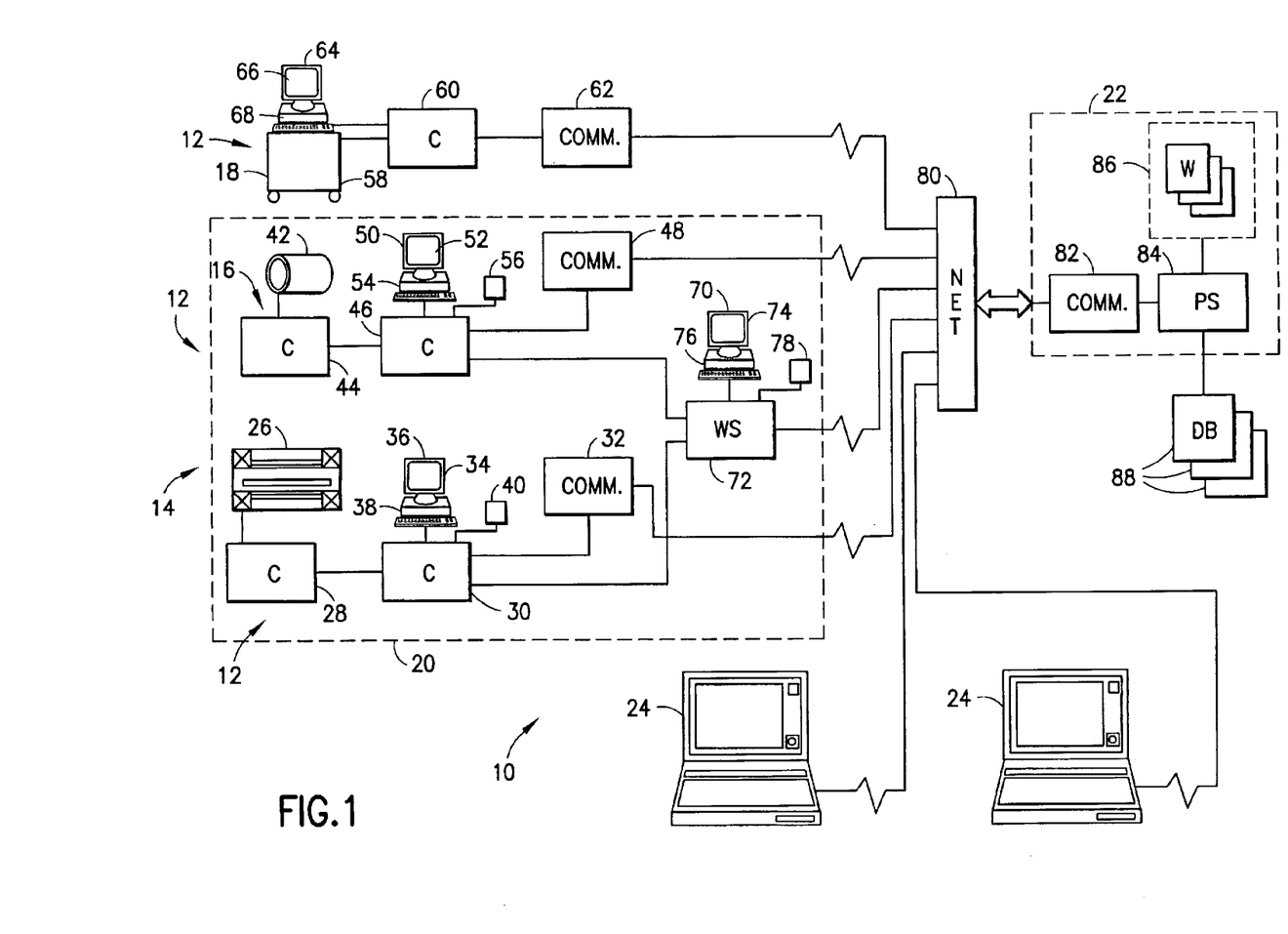
FIG. 1 is a diagrammatical representation of a series of medical diagnostic systems coupled to a service facility via a network connection for providing centralized service and data interchange between the diagnostic systems and the service facility.

Referring to FIG. 1, a service system 10 is illusrated for providing centralized service to a plurality of remotely located medical diagnostic systems 12. In the embodiment shown in FIG. 1, the medical diagnostic systems include a magnetic resonance imaging (MRI) system 14, a computerized tomography (CT) system 16, and an ultrasound imaging system 18. The diagnostic systems may be positioned in a single location or facility, such as a medical facility 20, or may be remote from one another as shown in the case of ultrasound system 18. The diagnostic systems are serviced from a centralized service facility 22. Moreover, a plurality of field service units 24 may be coupled in the service system for transmitting service requests, verifying service status, transmitting service data etc. as described more fully below.

In the system shown in FIG. 1, several different system modalities are provided with central service by the service facility. Service requests and data transmitted between the diagnostic systems and the service facility include data for identifying the type and modality of the serviced system, as well as data specifically adapted to the system modality and model. As used herein, the term "service request" is intended to include a wide range of inquiries, comments, suggestions and other queries or messages generated by a diagnostic system or an institution in which a system is disposed or managed. In particular, such requests may relate to problems occurring on systems, applications questions, questions of a general nature, questions relating to financial or subscription arrangements, information sharing, reports, applications, protocols, etc.

Depending upon the modality of the systems, various subcomponents or subsystems will be included. In the case of MRI system 14, such systems will generally include a scanner 26 for generating pulsed magnetic fields and for collecting signals from emissions by gyromagnetic material within a subject of interest. The scanner is coupled to a control and signal detection circuit 28 which, in turn, is coupled to a system controller 30. System controller 30 includes a uniform platform for interactively exchanging service requests, messages and data with service facility 22 as described more fully below. System controller 30 is linked to a communications module 32, which may be included in a single or separate physical package from system controller 30. System controller 30 is also linked to an operator station 34, which will typically include a computer monitor 36, a keyboard 38, as well as other input devices 40, such as a mouse. In a typical system, additional components may be included in system 14, such as a printer or photographic system for producing reconstructed images based upon data collected from scanner 14. Although reference is made herein generally to "scanners" in diagnostic systems, that term should be understood to include medical diagnostic data acquisition equipment generally, not limited to image data acquisition, as well as to picture archiving communications and retrieval systems, image management systems, facility or institution management systems, viewing systems and the like, in the field of medical diagnostics. More particularly, equipment incorporating the protected software and information files disclosed herein may include imaging systems, clinical diagnostic systems, physiological monitoring systems, etc.

Similarly, CT system 16 will typically include a scanner 42 which detects portions of x-ray radiation directed through a subject of interest. Scanner 42 is coupled to a generator and controller, as well as to a signal acquisition unit, represented collectively at reference numeral 44, for controlling operation of an x-ray source and gantry within scanner 42, and for receiving signals produced by a detector array moveable within the scanner. The circuitry within the controller and signal acquisition components is coupled to a system controller 46 which, like controller 30 mentioned above, includes circuitry for commanding operation of the scanner and for processing and reconstructing image data based upon the acquired signals. System controller 46 is linked to a communications module 48, generally similar to communications module 32 of MRI system 14, for transmitting and receiving data for central service of system 16. Also, system controller 46 is coupled to an operator station 50 which includes a computer monitor 52, a keyboard 54, as well as other input devices 56, such as a mouse. Moreover, like MRI system 14, CT system 16 will generally include a printer or similar device for outputting reconstructed images based upon data collected by scanner 42.

Other modality devices will include circuitry and hardware particularly configured for acquiring or producing signals in accordance with their particular design. In particular, ultrasound imaging system 18 will generally include a scanner and data processing unit 58 for transmitting ultrasound signals into a subject of interest, and for acquiring resultant signals which are processed for reconstructing a useful image. The system includes a system controller 60 which regulates operation of scanner 58 and which processes acquired signals to reconstruct the image. Moreover, system 18 includes a communications module 62 for transmitting service requests, messages and data between system controller 60 and service facility 22. System 18 also includes an operator station 64, including a monitor 66, as well as input devices such as a keyboard 68.

Where more than one medical diagnostic system is provided in a single facility or location, as indicated in the case of MRI and CT systems 14 and 16 in FIG. 1, these may be coupled to a management station 70, such as in a radiology department of a hospital or clinic. The management station may be linked directly to controllers for the various diagnostic systems, such as controllers 30 and 46 in the illustrated example. The management system may include a computer workstation or personal computer 72 coupled to the system controllers in an intranet configuration, a file-sharing configuration, a client/server arrangement, or any other suitable arrangement. Management station 70 will typically include a monitor 74 for viewing system operational parameters, analyzing system utilization, and exchanging service requests and data between the remote facility 20 and the central service facility 22. Input devices, such as a standard computer keyboard 76 and mouse 78, may also be provided to facilitate the user interface. It should be noted that, alternatively, the management system, or other diagnostic system components, may be stand-alone, i.e., not coupled directly to a diagnostic system. In such cases, the service platform described herein, and some or all of the service functionality may nevertheless be provided on the management system. Similarly, in certain applications, a diagnostic system may consist of a stand-alone or networked picture archiving communications and retrieval system or a viewing station provided with some or all of the functionality described herein.

The communication modules mentioned above, as well as workstation 72 and field service units 24, may be linked to service facility 22 via a remote access network 80. For this purpose, any suitable network connection may be employed. Preferred network configurations include both proprietary or dedicated networks, as well as open networks, such as the Internet. Data may be exchanged between the diagnostic systems, field service units 24, and central service facility 22 in any suitable format, such as in accordance with the Internet Protocol (IP), the Transmission Control Protocol (TCP), or other known protocols. Moreover, certain of the data may be transmitted or formatted via markup languages, such as the HyperText Markup Language (HTML), or other standard languages. The preferred interface structures and communications components are described in greater detail below.

Within service facility 22, messages, service requests and data are received by communication components as indicated generally at reference numeral 82. Components 82 transmit the service data to a service center processing system, represented generally at reference numeral 84 in FIG. 1. The processing system manages the receipt, handling and transmission of service data to and from the service facility. In general, processing system 84 may include one or a plurality of computers, as well as dedicated hardware or software servers for processing the various service requests and for receiving and transmitting the service data, as described more fully below. Service facility 22 also includes a bank of operator workstations 86, which may be staffed by service engineers who address the service requests and provide off- and on-line service to the diagnostic systems in response to the service requests. Also, processing system 84 may be linked to a system of databases or other processing systems 88 at or remote from the service facility 22. Such databases and processing systems may include extensive database information on operating parameters, service histories, etc., both for particular subscribing scanners and for extended populations of diagnostic equipment. As described below, such databases may be employed both for servicing of particular diagnostic systems and for tracking such servicing, as well as for deriving comparison data for use in servicing a particular system or a family of systems.

Figure 2:
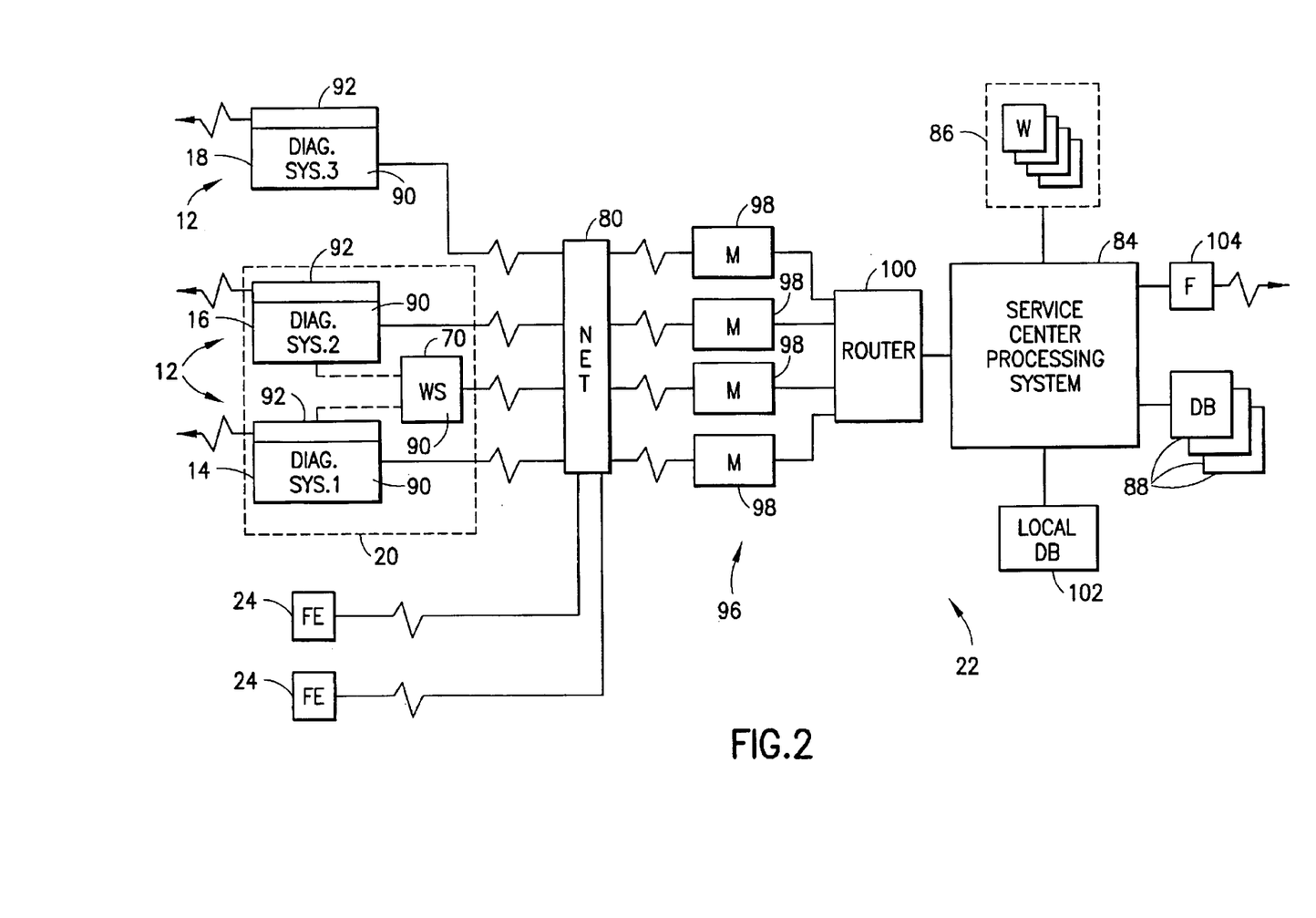
FIG. 2 is a block diagram of the systems shown in FIG. 1, illustrating certain functional components of the diagnostic systems and the service facility.

FIG. 2 is a block diagram illustrating the foregoing system components in a functional view. As shown in FIG. 2, remotely located field service units 24 and diagnostic systems 12 can be linked to the central service facility 22 via a network connection as illustrated generally at reference numeral 80. Within each diagnostic system 12, a uniform service platform 90 is provided. Platform 90, which is described in greater detail below with particular reference to FIG. 3, includes hardware, firmware, and software components adapted for composing and transmitting service requests and service task lists, transmitting and receiving service data, establishing network connections, and managing financial or subscriber arrangements between the diagnostic system and the service facility. Preferably, the platform 90 is integrated into the system controller of the diagnostic system. These platforms provide a uniform graphical user interface at each diagnostic system, which can be adapted to various system modalities to facilitate interaction of clinicians and radiologists with the various diagnostic systems for service functions. The platforms enable the scanner designer to interface directly with the control circuitry of the individual scanners, as well as with memory devices at the scanners, to access image, log and similar files needed for rendering requested or subscribed services. Where a management station 70 is provided, a similar uniform platform is preferably loaded on the management station to facilitate direct interfacing between the management station and the service facility. In addition to the uniform service platform 90, each diagnostic system is preferably provided with an alternative communications module 92, such as a facsimile transmission module for sending and receiving facsimile messages between the remotely located scanner and the central service facility.

Messages and data transmitted between the diagnostic systems and the service facility traverse a security barrier or "firewall" contained within processing system 84, which prevents unauthorized access to the service facility in a manner generally known in the art. A modem rack 96, including a series of modems 98, receives the incoming data, and transmits outgoing data through a router 100, which manages data traffic between the modems and the service center processing system 84.

As mentioned above, processing system 84 receives and processes the service requests and data, and interfaces with additional service components, both at the service facility and remote from the facility. As shown in FIG. 2, operator workstations 86 are coupled to the processing system, as are remote databases or computers 88. In addition, at least one local service database 102 is provided for verifying license and contract arrangements, storing service record files, log files, etc. Moreover, one or more communication modules 104 are linked to processing system 84 to send and receive facsimile transmissions between the service facility and the diagnostic systems or field service units.

Figure 3:
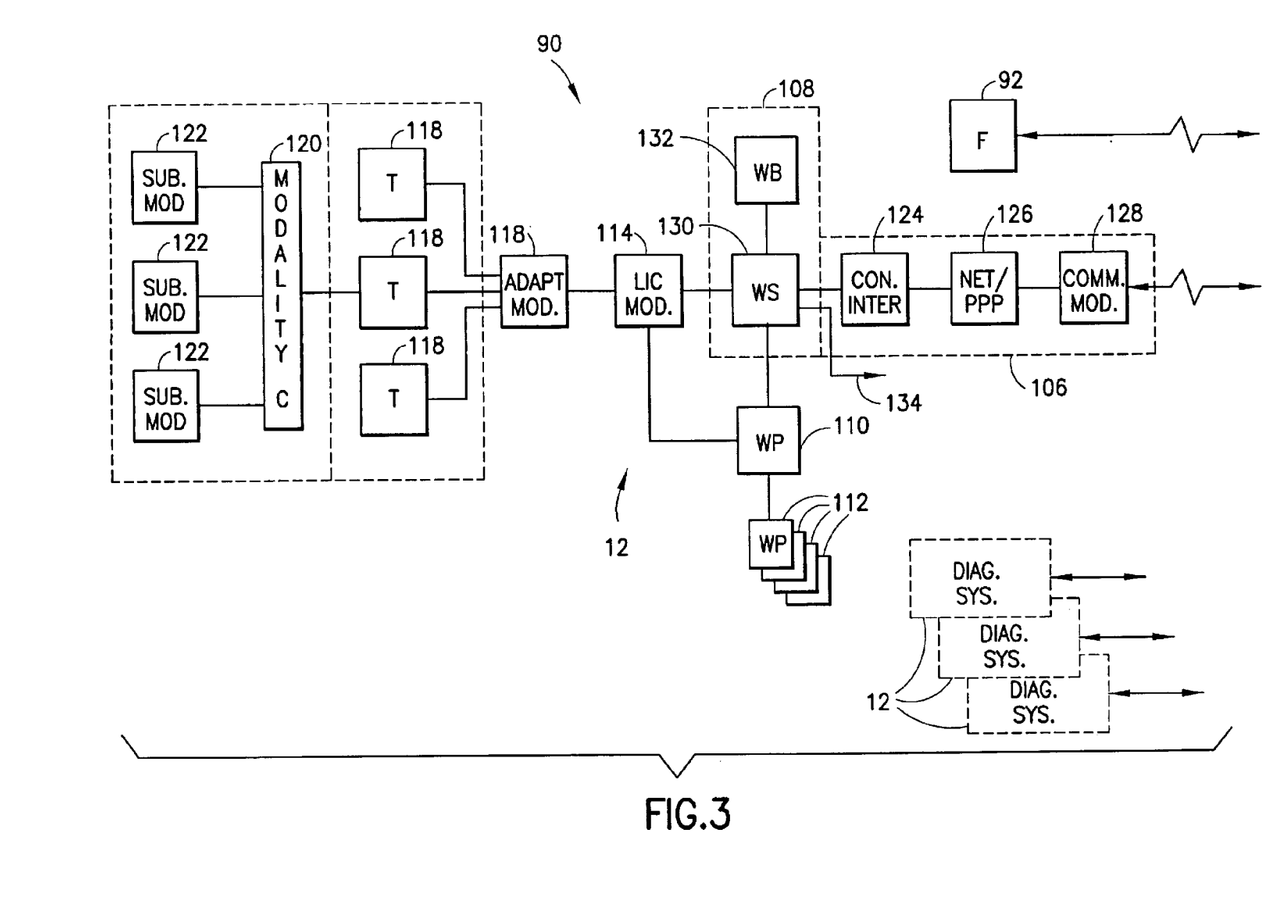
FIG. 3 is a block diagram of certain functional components within a diagnostic system of the type shown in FIGS. 1 and 2 for facilitating interactive centralized servicing of the diagnostic system.

FIG. 3 shows the various functional components comprising the uniform service platform 90 within each diagnostic system 12. The uniform platform includes a device connectivity module 106, as well as a web services connectivity module 108. Web services connectivity module 108 accesses a main web page 110 which, as mentioned above, is preferably a markup language page, such as an HTML page displayed for the system user on a monitor at the diagnostic system. Main web page 110 is preferably accessible from a normal operating page in which the user will configure examination requests, view the results of examinations, etc., such as via an on-screen icon. Through main web page 110, a series of additional web pages 112 are accessible. Such web pages permit service requests to be composed and transmitted to the central service facility, and facilitate the exchange of other messages, reports, software, protocols, etc. as described more fully below.

Web services connectivity module 108 is coupled to a license module 114 for verifying the status of the license, fee or contractual subscriptions between the diagnostic system and the service facility. As used herein, the term "subscription" should be understood to include various arrangements, contractual, commercial or otherwise for the provision of services, information, software, and the like, with or without payment of a fee. Moreover, the particular arrangements managed by systems as described below may include several different types of subscriptions, including time-expiring arrangements, one-time fee arrangements, and so-called "pay per use" arrangements, to mention but a few.

License module 114 is, in turn, coupled to one or more adapter utilities 116 for interfacing the browser, server, and communications components with modality interface tools 118. In a preferred configuration, several such interface tools are provided for exchanging data between the system scanner and the service platform. For example, modality interface tools 118 may include applets or servlets for building modality-specific applications, as well as configuration templates, graphical user interface customization code, etc. Adapters 116 may interact with such components, or directly with a modality controller 120 which is coupled to modality-specific subcomponents 122. The modality controller 120 and modality-specific subcomponents 122 will typically include a preconfigured processor or computer for executing examinations, and memory circuitry for storing image data files, log files, error files, etc. Adapter 116 may interface with such circuitry to convert the stored data to and from desired protocols, such as between the HyperText Transfer Protocol (HTTP) and DICOM, a standard for digital imaging communications. Moreover, transfer of files and data may be performed via any suitable protocol, such as a file transfer protocol (FTP) or other network protocol.

In the illustrated embodiment, device connectivity module 106 includes several components for providing data exchange between the diagnostic system and the central service facility. In particular, a connectivity service module 124 provides for interfacing with web services connectivity module 108. A Point-to-Point Protocol (PPP) module 126 is also provided for transmitting Internet Protocol (IP) packets over remote communication connections. Finally, a modem 128 is provided for receiving and transmitting data between the diagnostic system and the central service facility. As will be appreciated by those skilled in the art, various other network protocols and components may be employed within device connectivity module 106 for facilitating such data exchange.

Web services connectivity module 108 preferably includes a server 130 and a browser 132. Server 130 facilitates data exchange between the diagnostic system and the service facility, and permits a series of web pages 110 and 112 to be viewed via browser 132. In a preferred embodiment, server 130 and browser 132 support HTTP applications and the browser supports Java applications. Other servers and browsers or similar software packages may, of course, be employed for exchanging data, service requests, messages, and software between the diagnostic system and the central service facility. Finally, a direct network connection 134 may be provided between web server 130 and a local area network (not shown) within the remote medical facility.

In a preferred embodiment, the components comprising web services connectivity module may be configured via an application stored as part of the uniform platform. In particular, a Java application licensed to a service engineer enables the engineer to configure the device connectivity at the diagnostic system to permit it to connect with the central service facility. Features of the application are segmented into separate tabbed pages accessible by the service engineer. The application is entered via a license agreement screen. Once accepted, the service engineer can configure parameters of the system modem, the schedule for running automatic diagnostic checks, and establish electronic messaging, such as for automatic service report generation. Once the modem is configured, the service engineer establishes contact with the service facility and provides data enabling the service facility to download any remaining data needed for secure communication between the diagnostic system and the service center. Upon exit from the application, a configuration status is presented to the service engineer, including status of an automatic test of connectivity between the sites.

Figure 4:
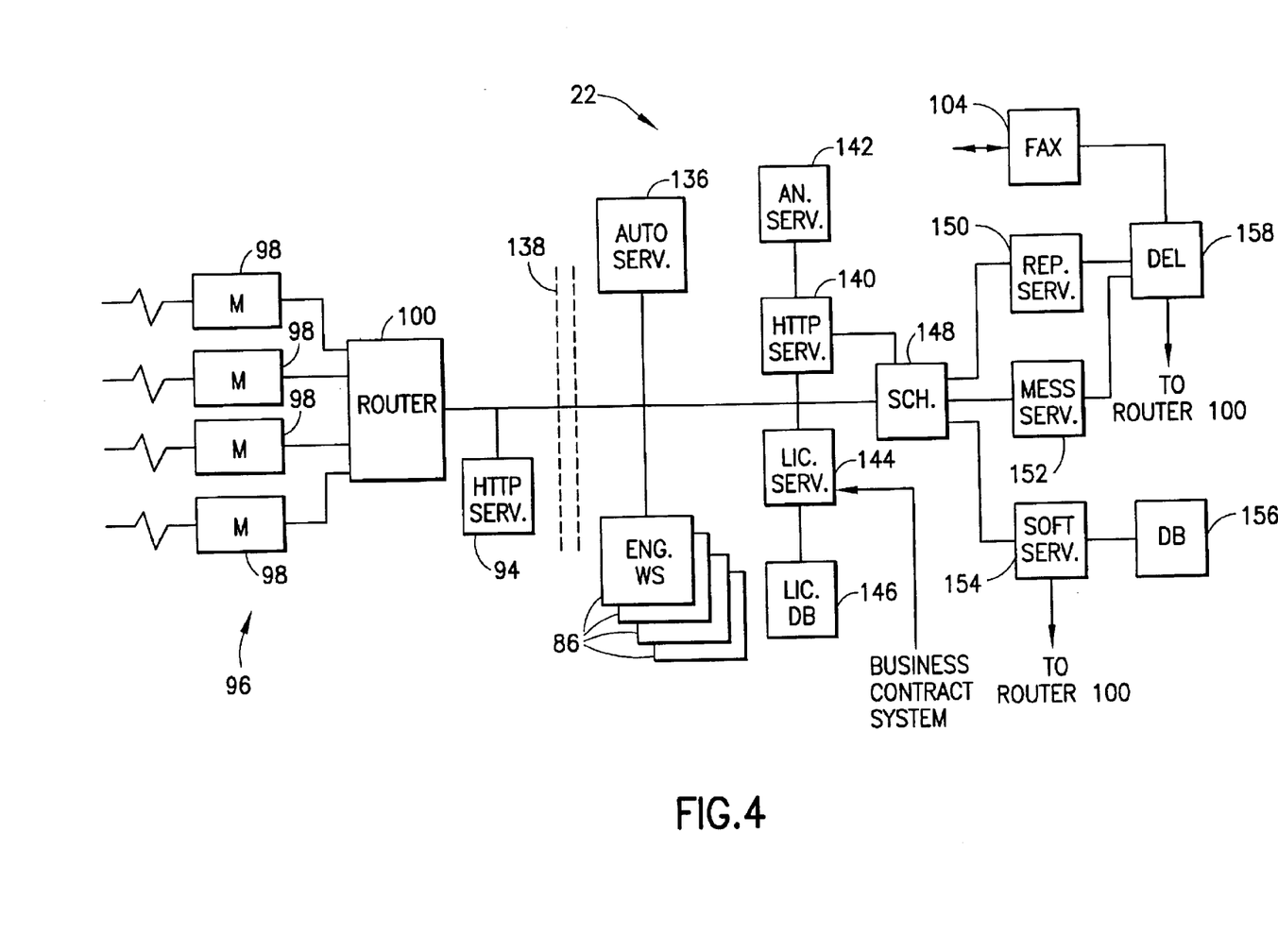
FIG. 4 is a block diagram of certain of the functional components of the service facility in accordance with the preferred embodiment of the invention for rendering interactive centralized service to a plurality of remotely located medical diagnostic systems.

FIG. 4 illustrates exemplary functional components for service facility 22. As indicated above, service facility 22 includes a modem rack 96 comprising a plurality of modems 98 coupled to a router 100 for coordinating data communications with the service facility. A so-called "front office" HTTP service server 94 receives and directs incoming and outgoing transactions with the facility. Server 94 is coupled to the other components of the facility through a firewall 138 for system security. Operator workstations 86 are coupled to the port manager for handling service requests and transmitting messages and reports in response to such requests. An automated service unit 136 may also be included in the service facility for automatically responding to certain service requests, sweeping subscribing diagnostic systems for operational parameter data, etc. In a preferred embodiment, the automated service unit 136 may operate independently of or in conjunction with the interactive service components comprising processing system 84. It should be noted that other network or communications schemes may be provided for enabling the service facility to communicate and exchange data and messages with diagnostic systems and central service units, such as systems including outside Internet service providers and virtual private networks.

Behind firewall 138, a so-called "back office" HTTP application server 140 coordinates handling of service requests, messaging, reporting, software transfers, etc. Other servers may be coupled to HTTP application server 140, such as service analysis servers 142 configured to address specific types of service requests. In the embodiment shown in FIG. 4, processing system 84 also includes a license server 144 which is coupled to a license database 146 for storing, updating and verifying the status of diagnostic system service subscriptions. Alternatively, license server 144 may be placed outside of firewall 138 to verify subscription status prior to admission to the service facility. The license server 144 receives an automated feed of contracting and subscription information from a business contract system (not shown in FIG. 4). In response to information from the business contract system, the license server 144 logs the license information into the license database 146, generates licenses based on the logged-in license information, and installs the generated licenses on the remote systems 12 via the network 80. The license server 144 also has the capability to remove or terminate an installed license from a remote system via the network in response to data received from the business contract system.

Handling of service requests, messaging, and reporting is coordinated by a scheduler module 148 coupled to HTTP server 140. Scheduler module 148 coordinates activities of other servers comprising the processing system, such as a report server 150, a message server 152, and a software download server 154. As will be appreciated by those skilled in the art, servers 150, 152 and 154 are coupled to memory devices (not shown) for storing data such as task lists, addresses, log files, message and report files, applications software, etc. In particular, as illustrated in FIG. 4, software server 154 is coupled via one or more data channels to a storage device 156 for containing transmittable software packages which may be sent directly to the diagnostic systems, accessed by the diagnostic systems, or supplied on pay-per-use or purchase basis. Message and report servers 152 and 154 are further coupled, along with communications module 104, to a delivery handling module 158, which is configured to receive outgoing messages, ensure proper connectivity with diagnostic systems, and coordinate transmission of messages to the diagnostic systems and the transmission of messages and task lists to remotely located field engineers via the network.

In a preferred embodiment, the foregoing functional circuitry may be configured as hardware, firmware, or software on any appropriate computer platform. For example, the functional circuitry of the diagnostic systems may be programmed as appropriate code in a personal computer or workstation, either incorporated entirely in or added to the system scanner. The functional circuitry of the service facility may include additional personal computers or workstations, in addition to a main frame computer in which one or more of the servers, the scheduler, etc., are configured. Finally, the field service units may comprise personal computers or laptop computers of any suitable processor platform. It should also be noted that the foregoing functional circuitry may be adapted in a variety of manners for executing the functions described herein. In general, the functional circuitry facilitates the exchange of service data between the diagnostic systems and a central service facility, which is preferably implemented in an interactive manner to provide regular updates to the diagnostic systems of service activities.

Figure 5:
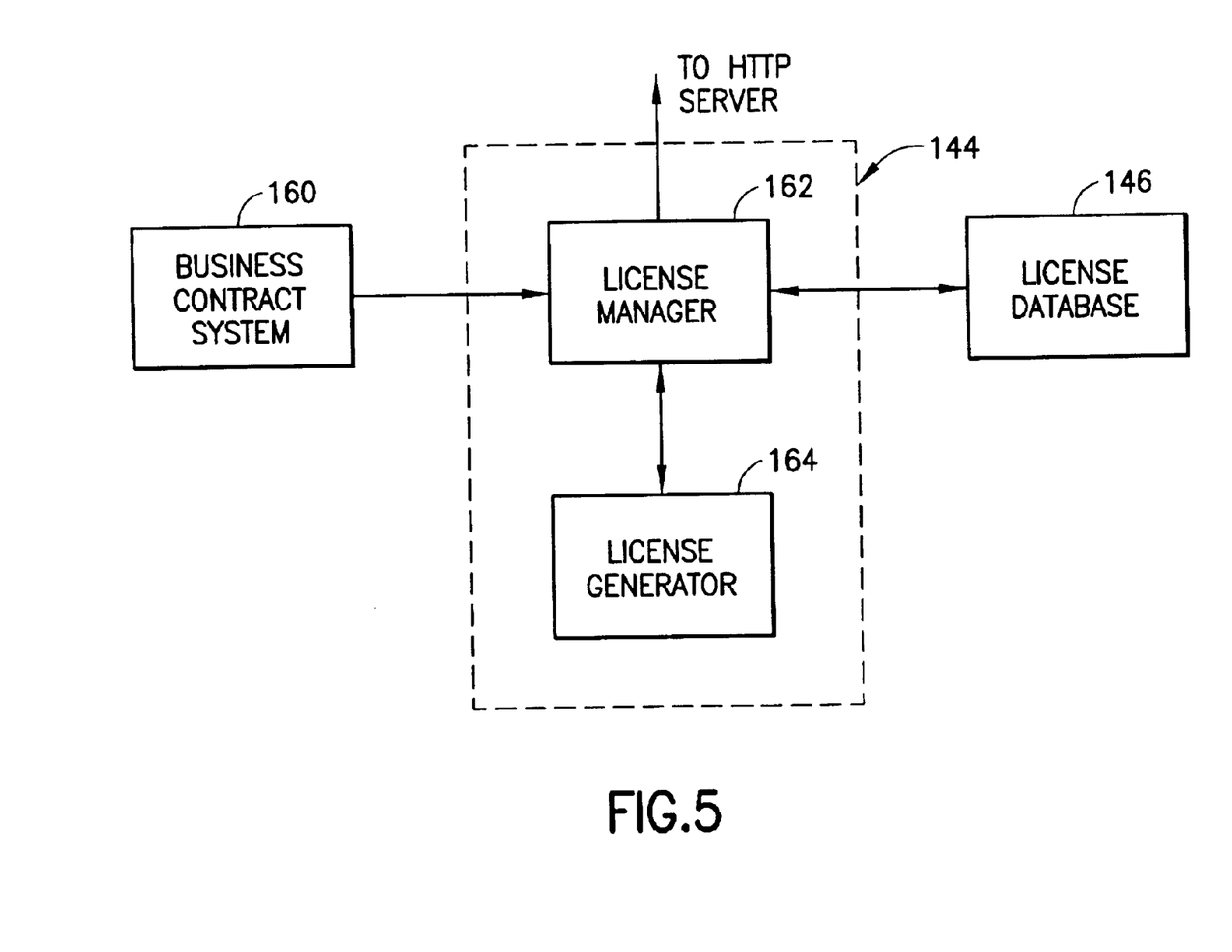
FIG. 5 is a block diagram showing a license server for automatic licensing between a contracting system and remote end-user applications in accordance with the preferred embodiment of the invention.

Referring to FIG. 5, the license server 144 in accordance with the preferred embodiment of the invention comprises a license manager 162 and a license generator 164. The license manager shown in FIG. 5 communicates with the license database 144, the license generator 164, and a business contract system 160. The license generator also communicates with the "back office" HTTP application server 140, shown in FIG. 4.

The business contract system 160 sells contracts and subscriptions, processes payments, performs accounting functions, and logs contract and subscription information in a business contract system database. The logged information comprises subscriber information, information concerning the modality and model of the remote diagnostic system, information identifying the service features, warranties and other options contracted for by the subscriber, the start and expiration dates of the contract, and other information. A typical business contract system comprises a multiplicity of workstations connected to a central server by a local area network and a central contract database where contract and subscription information is logged. The license manager 162 receives an automated feed of information from the central server of each business contract system 160, interprets which of the bundled features require a license, filters or strips out the information needed to generate the required license (hereinafter "source data"), and then logs the source data in the license database 146. Preferably, the source data comprises a subscriber or site identification code, a code identifying the remote system on which the license file will be installed, codes representing the service features, warranties and options contracted for, and the expiration date for each contract. Preferably, the license manager also stores the start date for each contract in the license database.

The license manager 162 then determines from the contract starting date whether a license file should be generated. If the license is effective immediately, then the license manager 162 outputs the source data to the license generator 164 with a request that the latter generate a tamper-proof encrypted license file. In response to that request, the license generator 164 generates a license file which contains a remote system identification code, a license expiration date, a checksum value, a digital signature and other information.

After the license generator 164 has generated the license file and stored it in temporary storage (180 in FIG. 6), the license manager 162 retrieves the license file from temporary storage and assigns the license file to the remote system identified by the remote system identification information. Instead of assigning the license file over the network, it may be assigned by placing the file on the remote system during manufacture or in the field. After loading the license file into the remote system, the license manager deletes the license file from temporary storage, but retains the data in the license database 146 so that the license could be recreated at any time.

In accordance with a further feature, the system allows for the purchase of a license or subscription by a customer at a remote site. In this case, a web page is downloaded to the remote site by the license manager 162 which comprises fields to be filled in with license information by the customer. The license information is then transmitted to the license manager, which takes the appropriate action, e.g., storing the license information in the license database 146 and then instructing the license generator 164 to generate a license based on that license information. In addition, the license manager sends the license information or relevant portions thereof to the business contract system 160 to update the records of the latter.

The remote system to which the license file is downloaded can be any type of remotely located equipment that has a computational capability resident thereon. The network via which the license file is downloaded may be a local area network, a wide area network, the Internet, Intranet, Extranet or some other type of communication link. As seen in FIG. 3, a license module 114 incorporated in the remote system 12 verifies the license file and the integrity of the files therein (i.e., whether the end user of the remote system has permission to use the files and whether the files have been modified or tampered with).

Both the license server 144 (see FIG. 4) and the license module 114 (see FIG. 3) are computer devices such as a personal computer, a workstation, a minicomputer, a mainframe or any other device containing a processor. The computers contain one or more computer programs for implementing the invention. A computer-readable medium such as a fixed data storage device tangibly embodies the computer programs and the computer operating systems. The computer programs are programmed in C and Java, but other languages such as C++, Lisp and Perl may be used.

Figure 6:
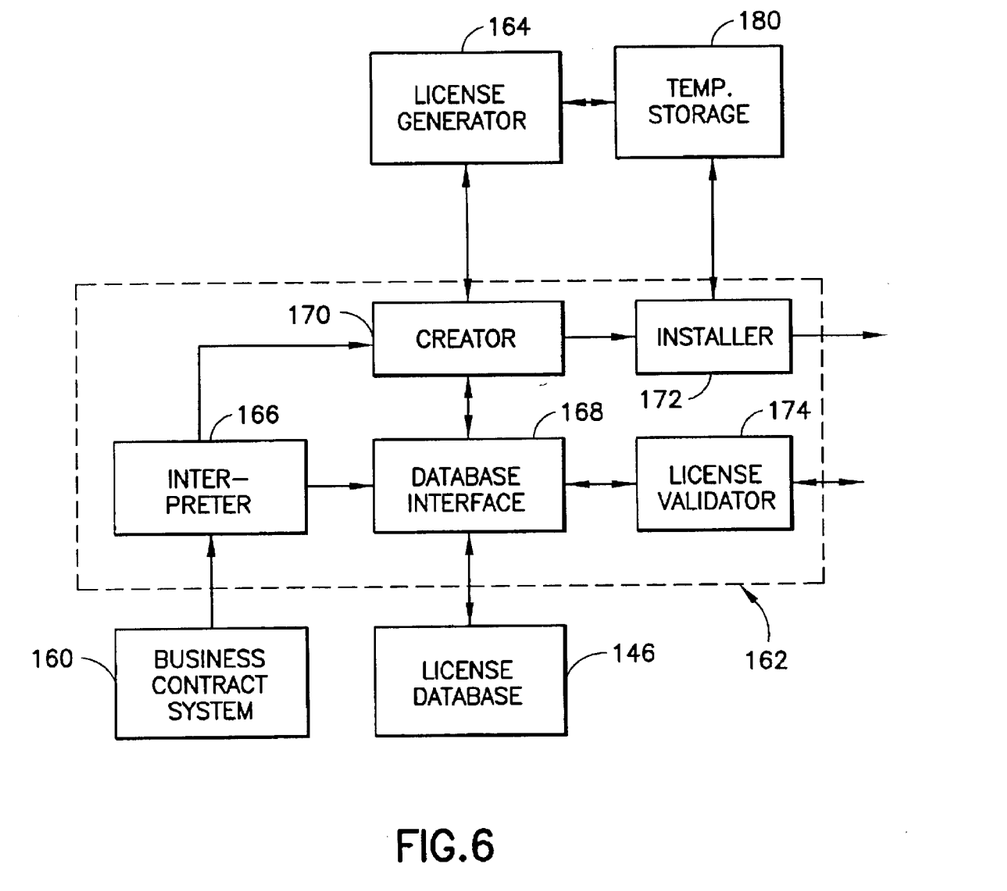
FIG. 6 is a block diagram showing the architecture of the license server in accordance with the preferred embodiment of the invention.

The architecture of the license server 144 in accordance with the preferred embodiment of the invention is shown in more detail in FIG. 6. The license manager 162 comprises an interpreter module 166 which receives the contract or subscription information from the business contract system 160, interprets which of the bundled features require a license, and extracts the source data needed for license generation. The interpreter module 166 stores the source data in the license database 146 via a database interface 168. Preferably, the source information is stored as a table in which the licensed service features and contract expiration dates are associated with the remote system identification code. After the source data for a license has been stored in the license database 146, the interpreter module 166 sends a trigger signal to a license creation module 170. The trigger signal is accompanied by a locator indicating the location of the relevant source data in the license database 146. The creation module 170 comprises programming for determining when a license needs to be generated and installed. In response to the trigger signal, the creation module 170 retrieves the license information from the license database 146 via the database interface 168 and sends that information to the license generator 164, along with a request that a license file be generated. The creation module 186 also tells the license generator where to store the licensed file in a temporary storage memory 180.

In accordance with the preferred embodiment of the invention, the license generator 164 includes in the license file the relevant license information received from the license manager (such as the remote system identification code and the license expiration date), and generates a checksum value, which is later encrypted to form part of a digital signature for the license file. Alternatively, the checksum value contains information that locks the use of the license to the particular diagnostic system. In particular, the license generator 164 can embed a unique identifier, which will represent the diagnostic system that the license file will be used on. Typically, the identifier comprises a hardware-based machine serial number, but can be any value that uniquely identifies the hardware device. The unique identifier also prevents license files from being moved from one diagnostic system to another. The license generator 164 stores the digitally signed license file in temporary storage 180.

Typically, the license module 144 will create a license file prior to installation of a diagnostic system at a customer site, when an upgrade occurs, when a customer purchases access to a new software package, or when a customer purchases a service agreement from the manufacturer of the diagnostic system.

When license generation has been successfully completed, the license generator 164 sends a message acknowledging completion to the creation module 170 of the license manager 162. The creation module 170 then instructs the installation module 172 to retrieve the stored digitally signed license file from temporary storage 180 and send it to the HTTP applications server 140, which in turn creates the connection with the appropriate remote system and assigns the license file to that system. As previously mentioned, the license file does not necessarily have to be assigned over the network and can be assigned at the time of manufacture or even in the field. When a license file is assigned to a remote system, that remote system is then able to execute the features included in the license identified by that license file. After the license file has been assigned to the remote system, it is deleted from temporary storage 180 by installation module 188 for security reasons.

If there are subsequent changes to the license or the files in the license, then the license manager 162 can update the remote system with the new information at any time. For example, the business contract system can advise the license manager that a particular subscription has been terminated, in which case the creation module would cause files having an invalid license to be generated and installed in the remote system, overwriting files having a valid license.

The license module 114 (see FIG. 3) located at the remote site is programmed to determine whether the remote system has a valid license. The license module 114 can verify the license file at any time. At a minimum, the license module 114 can verify the license file when the remote system 12 begins operation, whenever an application file or other file that is licensed is invoked, or periodically as part of a general system diagnostics run from the license manager 162. If the license module 114 verifies that the remote system 12 has a valid license, then the remote system is allowed to access the licensed files. As a further security measure, the central service facility will independently verify that a remote system requesting a service feature has a valid license. Referring to FIG. 4, when the "back office" HTTP applications server 140 receives a service request from a remote system, it sends a request for license validation to the license server 144. In particular, the request for validation is received by a license validation module 174 (see FIG. 6) in the license manager 162. The license validation module 174 receives site information, verifies site and license information with license database 146 via the database interface 168, and accesses resulting status information from the license database. Module 174 may then output the site status and license status information to the HTTP applications server 140 for enabling consideration of and response to a service request or for otherwise addressing the service request.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

What is claimed is:

1. A method for electronic processing of business contract information, comprising the steps of:

transmitting electronic contract data from a business contract system to a central service facility, said electronic contract data representing information for a contract to provide access to software residing on a remote system at a remote site;

extracting electronic license data from said electronic contract data, said extracted license data being a subset of said electronic contract data;

generating an electronic signal representing a request that a license file be generated in accordance with start date data in said license data;

generating a valid electronic license file derived at least in part from said extracted license data in response to said request that a license file be generated, said valid license file being sufficient by itself to authorize access to said software without the need for communication between said remote system and said central service facility each time said software is invoked;

transmitting said valid electronic license file from said central service facility to said remote site; and installing said transmitted license file into said remote system, wherein said extracted license data comprises said start date data, a code identifying said remote system on which said license file is to be installed, codes representing features of said software that will be accessible on said remote system pursuant to said contract, and expiration date data for said contract.

2. The method as recited in claim 1, further comprising the step of deleting said valid electronic license file from memory at said central service facility after said valid electronic license file has been transmitted to said remote site.

3. The method as recited in claim 1, further comprising the steps of:

storing said license data in a license database before said request signal is generated;

retrieving said license data from said license database; and transmitting the retrieved license data along with said request signal.

4. The method as recited in claim 3, wherein said stored electronic license data comprises a remote system identity, and said valid electronic license file comprises an encryption of identification data which is a function of said remote system identity, further comprising the steps of:

receiving electronic subscriber data comprising a remote system identity originated at a remote site;

retrieving license data from said license database, said license data comprising said stored remote system identity;

verifying that said received remote system identity matches said stored remote system identity; and outputting an electronic validation signal in response to said verification.

5. The method as recited in claim 1, wherein said electronic license data comprises a remote system identity and an expiration date of said license, further comprising the step of transmitting said remote system identity and said expiration date in association with said request signal.

6. The method as recited in claim 1, further comprising the steps of:

transmitting further electronic contract data from said business contract system to said central service facility representing information for terminating access to said software at said remote site;

extracting termination data from said further electronic contract data;

generating an invalid electronic license file in accordance with said termination data; and transmitting said invalid electronic license file from said central service facility to said remote site.

7. A license server comprising:

means for extracting license data from contract data representing a contract to provide access to software residing on a remote system at a remote site, said extracted license data being a subset of said electronic contract data;

means for requesting that a license file be generated in accordance with start date data in said license data;

means for generating a valid license file derived at least in part from said extracted license data in response to a request that a license file be generated, said valid license file being sufficient by itself to authorize access to said software without the need for communication between said remote system and said central service facility each time said software is invoked; and means for outputting said valid license file with a destination address corresponding to the remote site, wherein said extracted license data comprises said start date data, a code identifying said remote system on which said license file is to be installed, codes representing features of said software that will be accessible on said remote system pursuant to said contract, and expiration date data for said contract.

8. The server as recited in claim 7, further comprising:

memory for storing said valid license file after generation and before output; and means for deleting said valid license file from said memory after output.

9. The server as recited in claim 7, further comprising a database interface for interfacing with a license database outside said server, wherein said extracting means comprise means for sending license data via said database interface to the license database for storage, and said requesting means comprise means for retrieving license data via said database interface from the license database and sending the retrieved license data to said generating means.

10. The server as recited in claim 9, wherein said license data sent to said generating means and stored in the license database comprises a remote system identity, and said valid license file comprises an encryption of said remote system identity or a derivation of said remote system identity, further comprising:

means for receiving subscriber data comprising a remote system identity;

means for retrieving license data via said database interface from the license database, said license data comprising said stored remote system identity;

means for verifying that said received remote system identity matches said stored remote system identity; and means for outputting a validation signal in response to said verification.

11. The server as recited in claim 7, wherein said license data comprises a remote system identity and an expiration date of said license, and said requesting means further comprises means for outputting said remote system identity and said expiration date to said generating means.

12. The server as recited in claim 7, further comprising:

means for extracting termination data from further contract data representing termination of said contract to provide access to software at a remote site;

means for generating an invalid license file in accordance with said termination data; and means for outputting said invalid license file with said destination address.

13. A system comprising a central service facility connected to a multiplicity of remote systems via a network, and a business contract system connected to said central service facility, wherein said central service facility comprises a license processor which is programmed to perform the following steps:

receiving contract data from said business contract system, said contract data representing information for respective contracts to provide access to software at respective remote systems;

extracting respective sets of license data from said contract data, each set of said extracted license data being a subset of contract data for a respective contract;

generating respective valid electronic license files respectively derived at least in part from said sets of extracted license data in accordance with respective start date data in said sets of extracted license data, each of said valid license files being sufficient by itself to authorize access to said software at a respective remote site without the need for communication between said remote system and said central service facility each time said software is invoked; and outputting said respective valid electronic license files for transmission from said central service facility to said respective remote systems, wherein said extracted license data for each set comprises said start date data for said respective contract, a code identifying the respective remote system on which said respective license file is to be installed, codes representing features of said software that will be accessible on said respective remote system pursuant to said respective contract, and expiration date data for said respective contract.

14. The system as recited in claim 13, wherein said license processor is further programmed to delete each valid electronic license file from internal memory after it has been transmitted to a respective remote site.

15. The system as recited in claim 13, further comprising a license database, wherein said license processor is further programmed to perform the steps of:
   storing said license data in said license database after said extracting step, said license data comprising remote system identification data;
   receiving remote system identification data originated at one of said remote systems;
   verifying that stored remote system identification data matches said received remote system identification data; and
   outputting a validation signal in response to said verification.

16. The system as recited in claim 13, wherein said extracted license data comprises a remote system identification data and expiration dates for said licenses.

17. The system as recited in claim 13, wherein said license processor is further programmed to perform the steps of:
   receiving further electronic contract data from said business contract system representing information for terminating access to software at one of said remote sites;
   extracting termination data from said further electronic contract data;
   generating an invalid electronic license file in accordance with said termination data; and
   outputting said invalid electronic license file for transmission from said central service facility to said one remote site.

18. A system for automatic processing of contract data into a license file for providing access to software at a remote site, comprising:
   a business contract system for outputting electronic contract data representing information relating to a contract to provide access to software at a remote site, said electronic contract data comprising contract starting and expiration date data, remote system identification data, and licensed service feature data;
   a data interpretation module programmed to extract remote system identification data and licensed service feature data and contract expiration data associated with said remote system identification data from said electronic contract data, store said extracted data in a license database and issue a trigger signal;
   a license generator programmed to generate a valid tamper-proof electronic license file for providing access to said software at said remote site, said electronic tamper-proof license file being based in part on said extracted data, and then storing said valid tamper-proof electronic license file in a temporary storage memory;
   means for downloading said valid electronic license file to said remote site;
   an installation module programmed to retrieve said valid electronic license file from said temporary storage memory and transmit it to said downloading means; and
   a license creation module programmed to respond to said trigger signal by determining when an electronic license file needs to be generated and installed based on said contract starting date data, and if said license file needs to be generated, retrieving said stored extracted data from said license database and sending that data to said license generator along with a request that said electronic license file be generated and with an instruction where to store said valid tamper-proof electronic license file in said temporary storage memory, and further programmed to send a message instructing said installation module to retrieve said valid electronic license file from said temporary storage memory and transmit electronic license to said downloading means in response to a message from said license generator acknowledging completion of said license generation.

19. The system as recited in claim 18, further comprising:
   an input for receiving remote system identification data originated at said remote system;
   a license validator for verifying that said stored remote system identification data matches said received remote system identification data; and
   an output for transmitting a validation signal in response to said verification.

20. The system as recited in claim 18, wherein said business contract system may output further electronic contract data representing information for terminating access to software at said remote site, and said data interpretation module is programmed to extract termination data from said further electronic contract data, further comprising means for generating an invalid electronic license file in accordance with said termination data and addressed so that said downloading means downloads said invalid electronic license file to said remote site.

* * * * *